United States Patent [19]

Bedenbender et al.

[11] 4,429,898
[45] Feb. 7, 1984

[54] SUSPENSION ASSEMBLY FOR SEISMIC EXPLORATION VEHICLE

[75] Inventors: John W. Bedenbender, Plano, Tex.; Marvin C. Cook; Otis A. Johnston, both of Ponca City, Okla.

[73] Assignee: Mertz, Inc., Ponca City, Okla.

[21] Appl. No.: 242,358

[22] Filed: Mar. 10, 1981

[51] Int. Cl.³ .............................................. B60G 11/28
[52] U.S. Cl. .................................... 280/678; 305/23; 305/34; 180/9.54
[58] Field of Search .............. 280/676, 677, 678, 681, 280/682, 683; 180/9.1, 9.5, 9.54, 190, 192, 193; 181/114, 122; 305/16, 23, 24, 27, 28, 29, 34

[56] References Cited

U.S. PATENT DOCUMENTS

| | | |
|---|---|---|
| 2,389,028 | 11/1945 | Cost ................................. 305/28 |
| 2,398,248 | 4/1946 | Reid ................................. 280/104.5 |
| 2,758,849 | 8/1956 | Compton ......................... 280/104.5 |
| 3,000,648 | 9/1961 | Buisson ........................... 280/104.5 |
| 3,013,843 | 12/1961 | Sinko ................................ 305/28 |
| 3,397,896 | 8/1968 | Willetts ........................... 280/104.5 |
| 3,471,166 | 10/1969 | Clark ............................... 280/104.5 |
| 3,826,325 | 7/1974 | Purcell et al. ..................... 180/9.5 |
| 3,921,999 | 11/1975 | Masser ........................... 280/104.5 R |
| 4,192,528 | 3/1980 | Bergquist ........................ 280/677 |
| 4,202,564 | 5/1980 | Strader ............................ 280/678 |

Primary Examiner—Robert R. Song
Assistant Examiner—Dennis Pedder
Attorney, Agent, or Firm—Dunlap & Codding

[57] ABSTRACT

An improved suspension assembly for a seismic exploration vehicle having a substantially rigid main frame supported and moved by track assemblies disposed along opposing sides of the frame. The suspension assembly includes two bogies which engage the inner periphery of a track on one side of the vehicle and each of the two bogies is mounted on one end of a bogie arm that is pivotally connected, at the other end of the bogie arm, to a central portion of a walking beam pivotally connected to the vehicle frame. End portions of the walking beam overlay the distal ends of the bogie arms and air bags are mounted between the distal ends of the bogie arms and the ends of the walking beam to bias the bogie arms in a downward direction.

16 Claims, 8 Drawing Figures

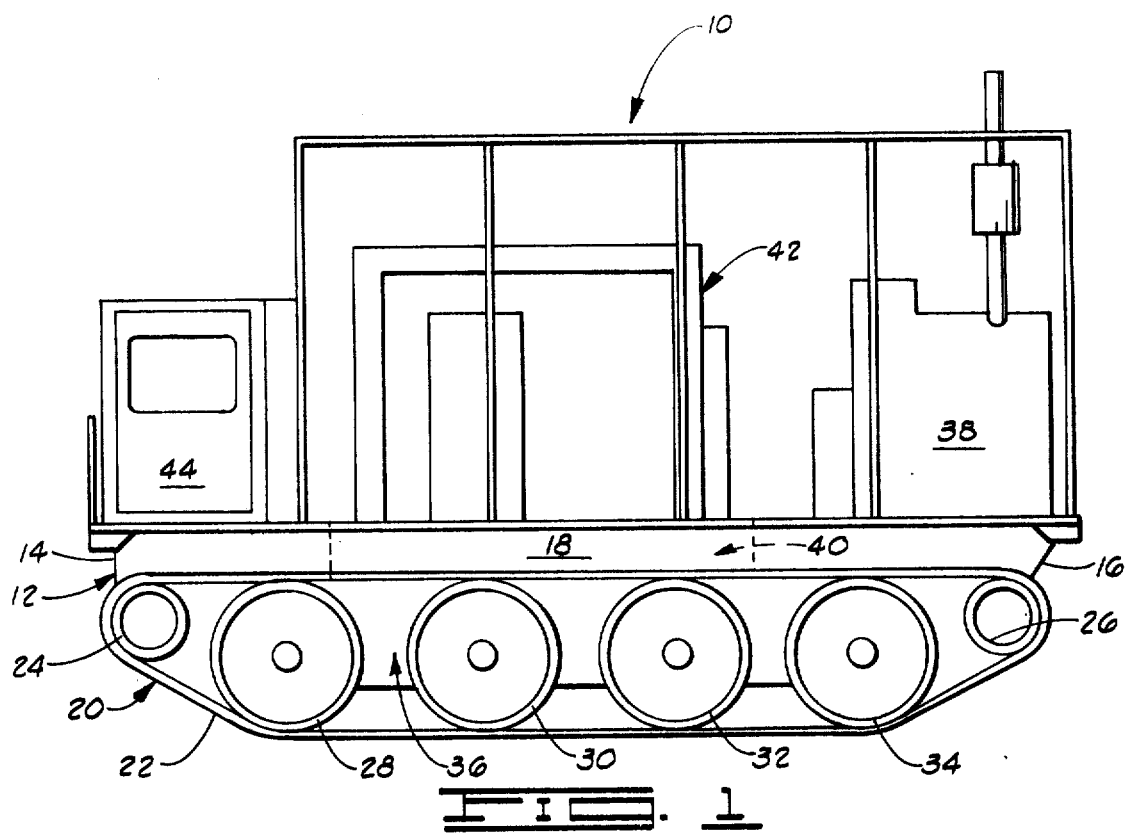
FIG. 1
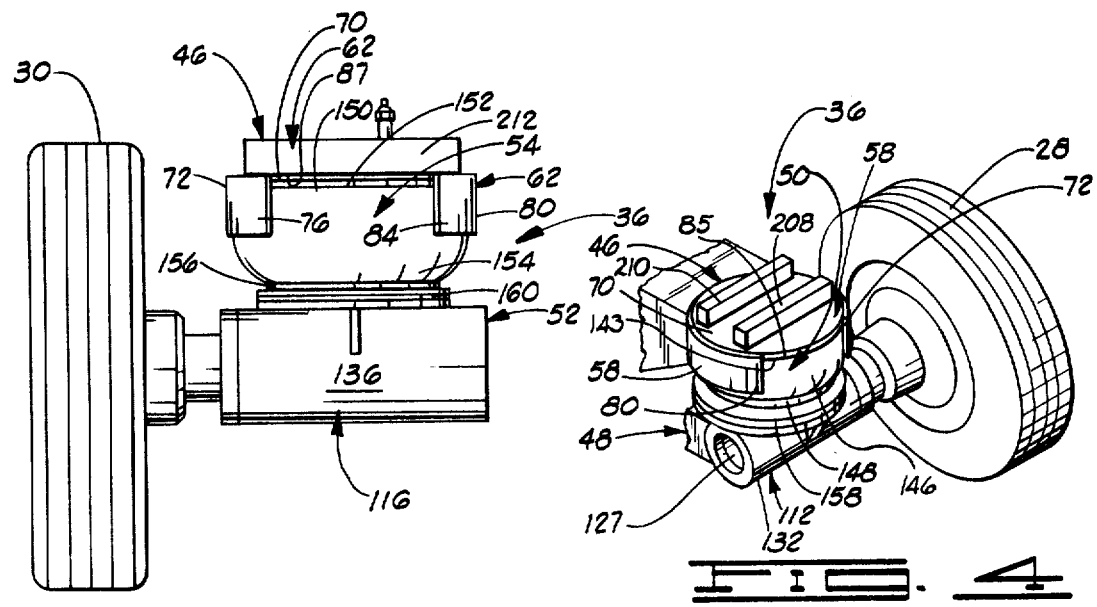
FIG. 3
FIG. 4

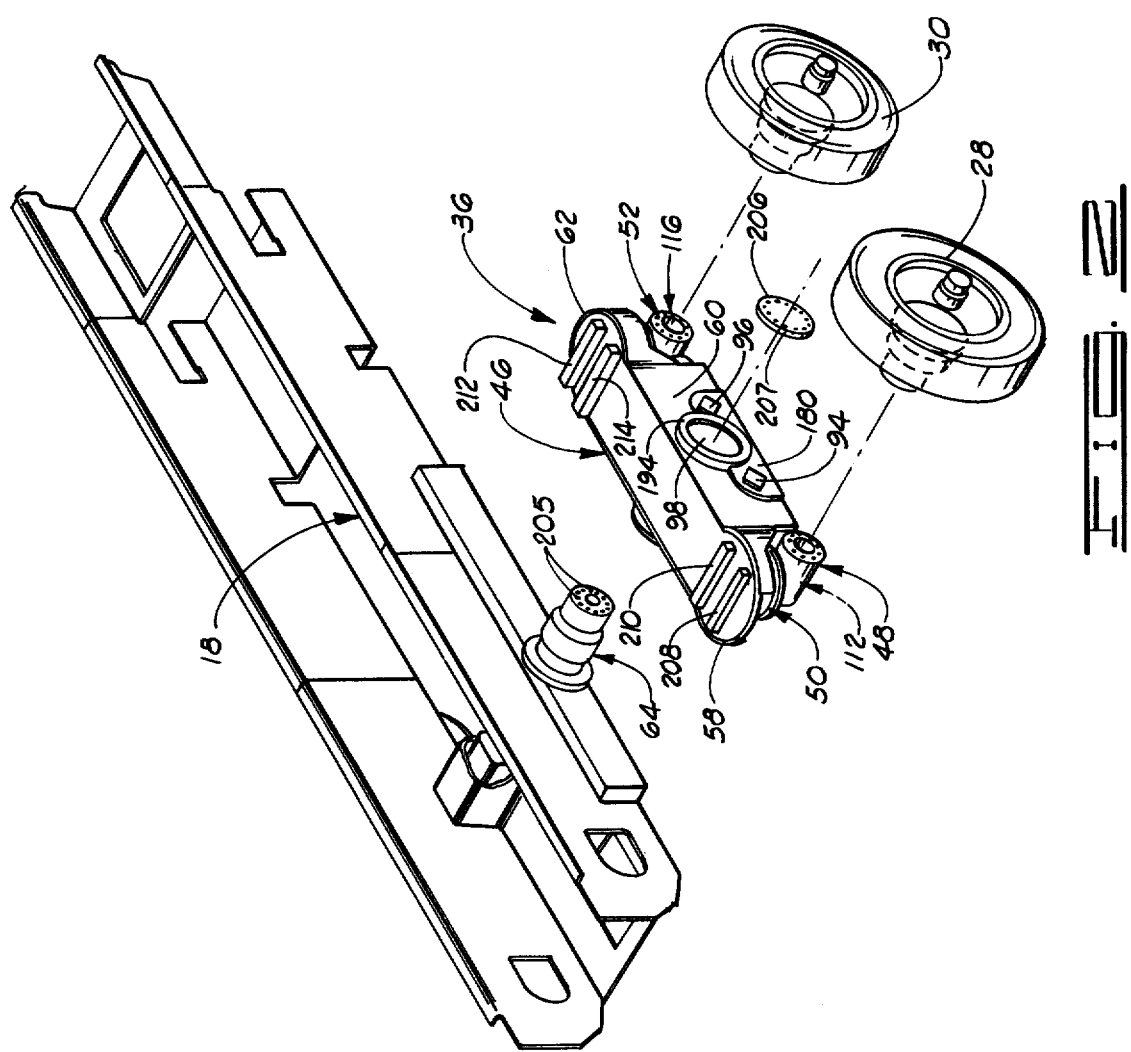

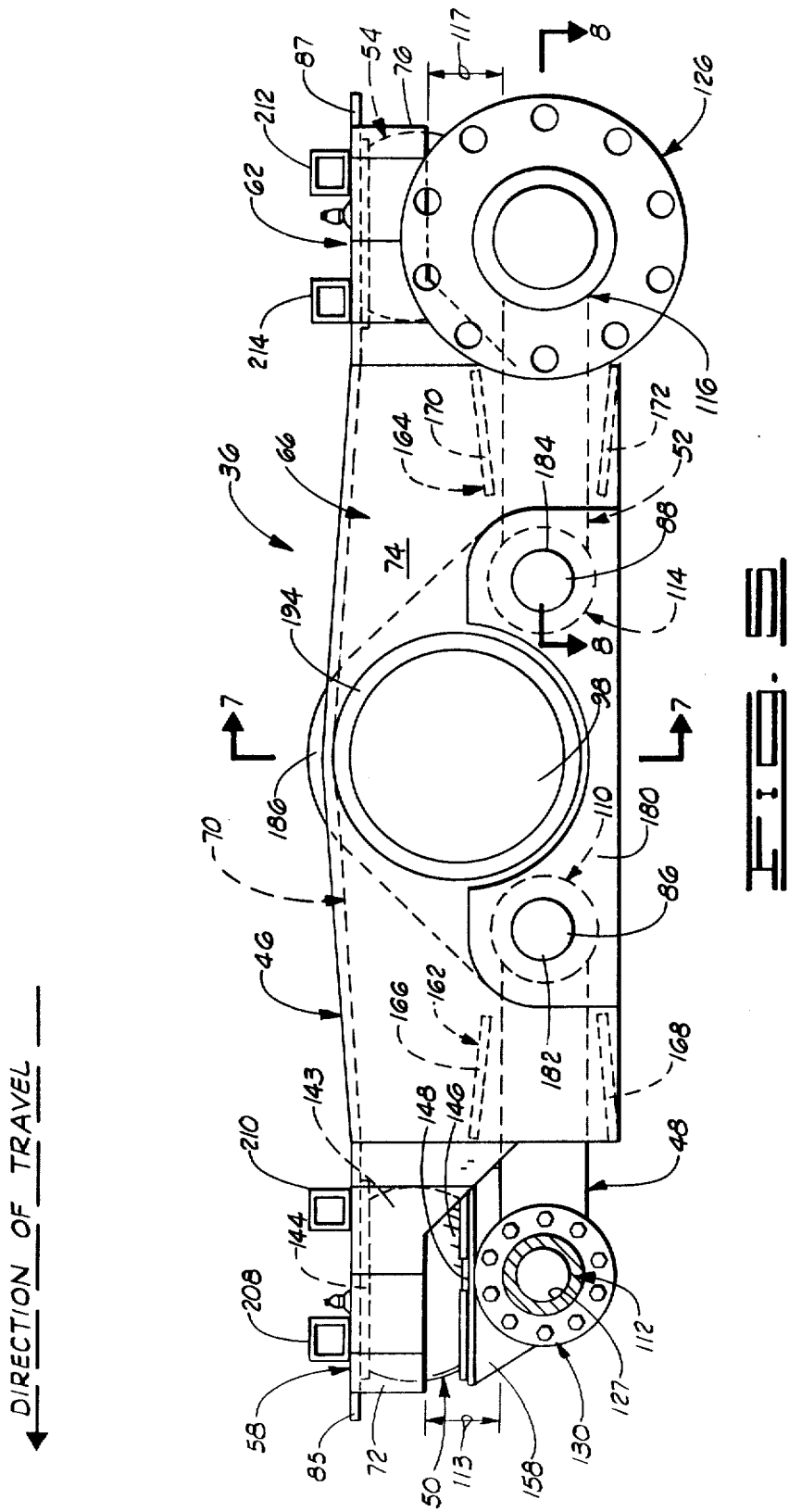

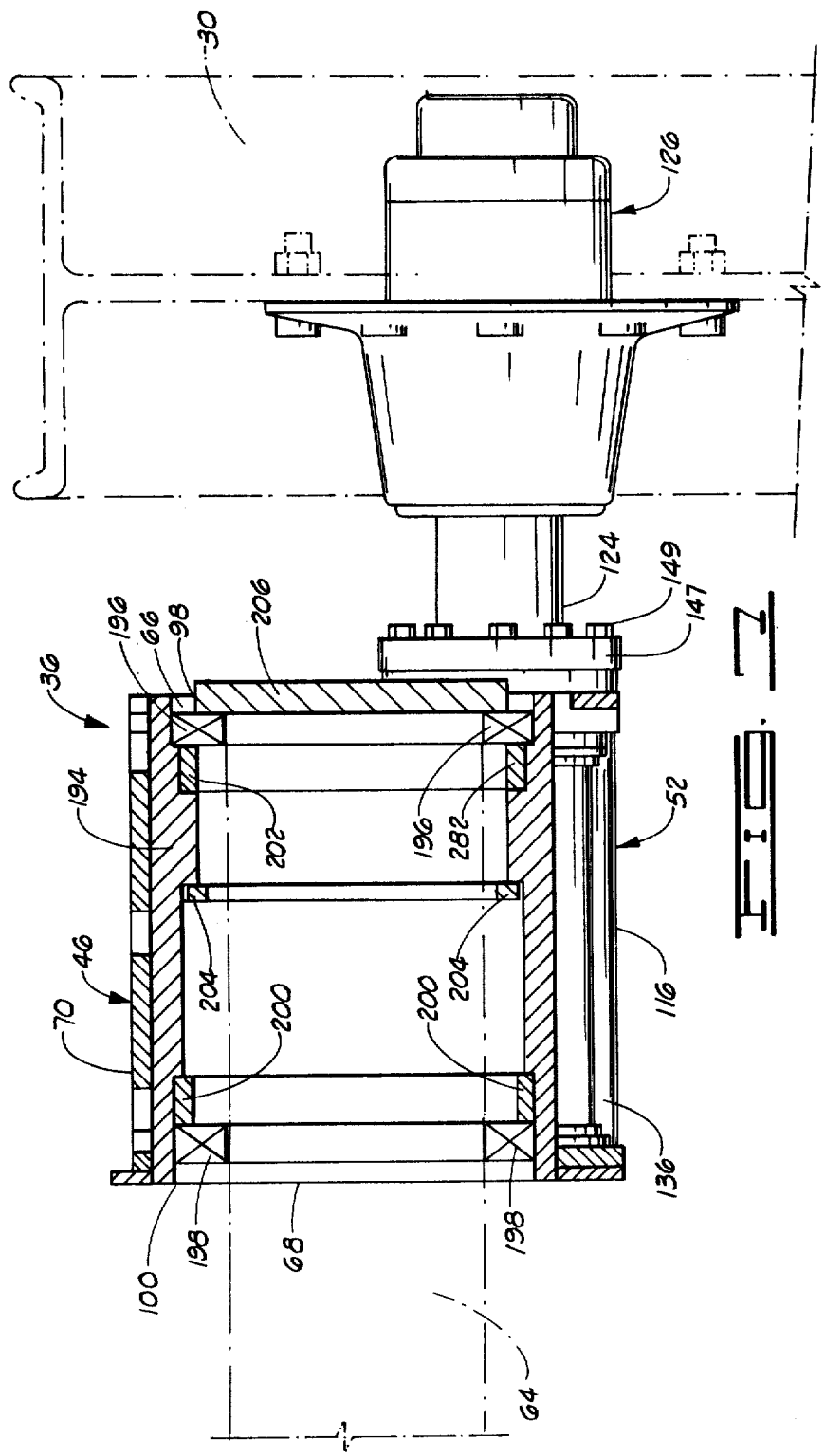

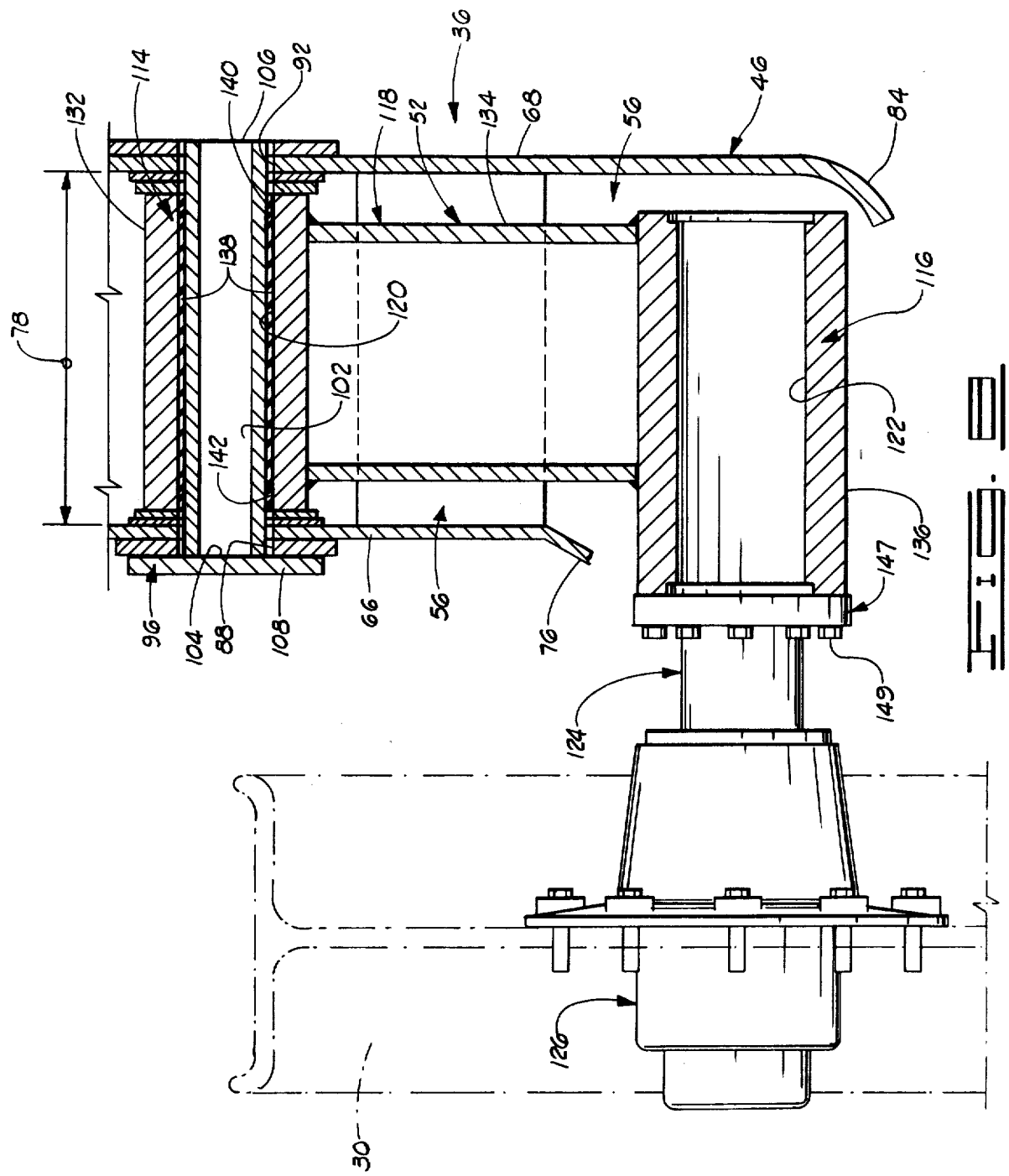

4,429,898

SUSPENSION ASSEMBLY FOR SEISMIC EXPLORATION VEHICLE

BACKGROUND OF THE INVENTION

1. Field of the Invention

This invention relates to a suspension assembly for a tracked vehicle. In one aspect the present invention relates to an improved suspension vehicle for a seismic exploration vehicle having a substantially rigid main frame supported and moved by track assemblies disposed along each side of the main frame wherein the frame defines an opening therein adapted to receive seismic exploration apparatus.

2. Discription of the Prior Art

Vehicles having a substantially rigid main frame supported and moved by track assemblies disposed along opposing sides of the frame have heretofore been used as off-the-road vehicles for traveling over rough terrain. Generally, the suspension system employed in such track-type vehicles has comprised a walking beam to support the bogies of the track assembly in order to maintain the bogies in contact with the terrain and thus to stabilize the vehicle. In addition, the combination of the walking beam and the bogies of the track assemblies have been utilized to equalize the load and the driving and braking torque imposed on the driving axles of the vehicle.

While the development of such vehicles has been the subject of a great amount of inventive work and research, most of the prior art vehicles have not found acceptance for use as seismic exploration vehicles for use over extremely rough terrain because seismic exploration vehicles desirably have a large opening in the frame thereof at a position between the bogies of the supporting track assemblies; and the prior art suspension assemblies have generally resulted in excessive vibration of the vehicle. The excessive vibration of the vehicle has not only made the operation of the vehicle very uncomfortable for the driver-operator but the excessive vibration has often resulted in damage, not only to the vehicle itself, but also to the expensive and sensitive seismic exploration apparatus mounted on the vehicle. Because of the remoteness of the areas in which seismic exploration vehicles are employed repair of the vehicles due to the excessive vibration resulting from the suspension system has created serious problems. Thus, new and improved suspension systems for seismic exploration vehicles, especially of the track type, has been desired in an effort to overcome the breakdowns in such vehicles resulting from vibration of same in their use when employing the suspension systems heretofore known.

SUMMARY OF THE INVENTION

Therefore an object of the present invention is to provide an improved suspension system for use in seismic exploration vehicles having mounted thereon a seismic apparatus which is selectively movable between a ground engaging position and a raised position.

Another object of the invention is to provide an improved suspension assembly for seismic exploration vehicles having a substantially rigid main frame supported and moved by track assemblies disposed along opposing sides of the frame wherein the frame defines an opening between the track assemblies of the vehicle for receiving a seismic apparatus which is selectively movable between a ground engaging position and a raised position.

Another object of the invention is to provide an improved suspension assembly for seismic exploration vehicles which does not suffer from the disadvantages of the prior art suspension assemblies.

Other objects, advantages and features of the present invention will become apparent to those skilled in the art from a reading of the following detailed discription when read in conjunction with the accompanying drawings which illustrate the invention.

BRIEF DESCRIPTION OF THE DRAWINGS

FIG. 1 is a side elevational view of a seismic exploration vehicle supported and moved by a plurality of track assemblies, each of the track assemblies being connected to the frame of the vehicle by the improved suspension assembly of the present invention.

FIG. 2 is an exploded perspective view of the improved suspension assembly of the present invention, illustrating a side of the frame of the exploration vehicle for pivotal attachment of the improved suspension assembly thereto.

FIG. 3 is an elevational view of the distal end of a rearward bogie arm of the improved suspension assembly of the present invention illustrating the interconnection of the distal end of the rearward bogie arm to the bogie.

FIG. 4 is a perspective view in partial cutaway of the distal end of a forward bogie arm of the suspension assembly of the present invention illustrating the interconnection of the distal end of the forward bogie arm to the bogie.

FIG. 5 is an enlarged side elevational view of the suspension assembly of the present invention illustrating the relationship of the walking beam, the forward bogie arm, and the rearward bogie arm of the suspension assembly, the bogies of the track assembly being removed for clarity.

FIG. 7 is an enlarged cross-sectional view of the improved suspension assembly of FIG. 5 taken along the line 7—7.

FIG. 8 is an enlarged, partially broken cross-sectional view of the improved suspension assembly of FIG. 5 taken along the line 8—8.

DETAILED DESCRIPTION OF THE INVENTION

Figure 6:
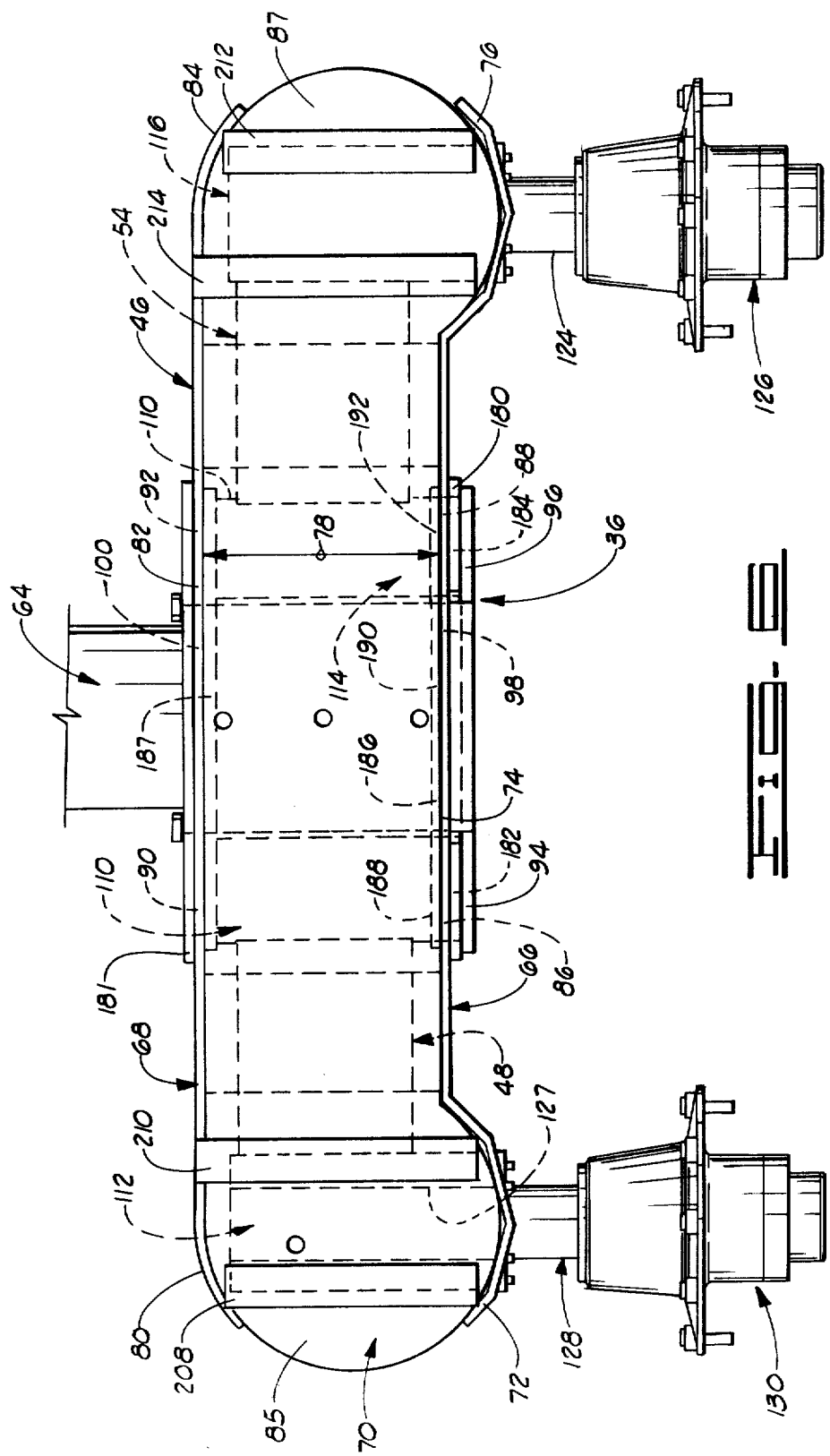
FIG. 6 is a top plan view of the improved suspension assembly of the present invention having wheel hubs and spindles connected to the distal end portions of the forward bogie arm and the rearward bogie arm of the suspension assembly.

Referring to the drawings in general and more particularly to FIG. 1, shown therein and designated by the general reference numeral 10 is a seismic exploration vehicle. The seismic exploration vehicle 10 is provided with a substantially rigid main frame 12 having a forward end 14, a rearward end 16, a left side 18, and a right side (not shown) which is substantially identical to the left side 18.

The substantially rigid main frame 12 is supported by a pair of track assemblies disposed along opposing sides of the frame 12, such as track assembly 20 disposed along the left side 18 of the frame 12. The track assemblies support the rigid main frame 12 and are disposed along opposite sides of the main frame 12 and operably connected thereto such that the two track assemblies are disposed in a parallel, spatial relationship. Since the two track assemblies employed to support the rigid main frame 12 of the seismic exploration vehicle 10 are identical in construction and operation, only the track assembly 20 secured to the left side 18 of the main frame 12 will be described in detail.

The track assembly 20 comprises an endless track 22, a drive sprocket 24, idler sprocket 26, and a plurality of bogies 28, 30, 32 and 34 disposed on an inside perimeter of the endless track 22 to maintain the endless track 22 in proper alignment and to support the seismic exploration vehicle 10. The bogies 28, 30, 32 and 34 are rotatably connected to an improved suspension assembly 36 constructed in accordance with the present invention, and which will be more fully described in detail hereinafter.

The drive sprocket of the track assemblies, such as the drive sprocket 24 of the track assembly 20, is drivingly connected to a power drive unit 38 for drivingly moving the main frame 12 of the seismic exploration vehicle 10. The power drive unit 38 may be of a conventional design such as, for example, a diesel powered engine, and interconnecting components to drivingly connect the power drive unit 38 to the drive sprocket 24 of the track assembly 20 (and thus the drive sprocket of the track assembly on the opposed side of the machine not shown). Such power units and the operation thereof are well known in the art and a detailed description thereof is not required herein.

An opening 40 (indicated by phantom in FIG. 1) is formed between the left side 18 of the rigid main frame 12 and the right side (not shown), the opening 40 extending also between the opposed track assemblies supporting the rigid main frame 12 of the vehicle 10 so that a seismic exploration apparatus 42 such as, for example, a low-profile P-wave acuator/base plate assembly or a sheer wave acuator/base plate assembly can be mounted in the opening 40 and secured to the rigid main frame 12 of the seismic exploration vehicle 10 such that the seismic exploration apparatus 42 can be selectively movable between a ground engaging position and a raised postion.

The major portions of the various manually operated, control actuating elements which are utilized by an operator to control and operate the movement of the seismic exploration vehicle 10, as well as the seismic exploration apparatus 42, are supported in a control console 44. The control console 44 is supported on the main frame 12 generally near the forward end 14 thereof.

The suspension assembly 36 of the present invention is more clearly illustrated in FIG. 2. The unique construction of the suspension assembly 36 allows independent movement of the bogies of the track assemblies, such as the bogies 28 and 30 of the track assembly 20. In many instances it is desirable that two of the suspension assemblies 36 be pivotally connected in tandem to the left side 18 of the main frame 12, and two of the suspension assemblies 36 be pivotally connected in tandem to the right side (not shown) of the rigid main frame 12. Thus, the suspension assembly 36 of the present invention allows not only for the independent movement of the bogies of the two track assemblies, as well as the bogies of one of the track assemblies, such as bogies 28 and 30 of the track assembly 20, but the unique construction of the suspension assembly 36 reduces vibration and eliminates the requirement of transverse axles extending between the opposed suspension assemblies secured to the left side 18 and the right side (not shown) of the rigid main frame 12.

Referring more specifically to FIGS. 2 and 5 the suspension assembly 36 for connecting two adjacently disposed bogies, such as bogies 28, 30, to one side of the main frame 12 of the vehicle 10, such as the left side 18, comprises a walking beam 46, a forward bogie arm 48, a first biasing member 50, a rearward bogie arm 52, and a second biasing member 54 (see FIGS. 3 and 5). The unique configuration of the walking beam 46, the forward bogie arm 48, and the rearward bogie arm 52, in combination with the interconnection of the first and second biasing members 50, 54 to the forward bogie arm 48 and the rearward bogie arm 52, respectively, substantially isolates the walking beam 46 from excessive movement caused by the vehicle 10 passing over rough terrain. Thus, the improved suspension assembly 36 not only prevents discomfort to the driver-operator of the vehicle 10, but also prevents damage to the vehicle 10 and the seismic exploration apparatus 42 mounted on the vehicle 10 when the vehicle 10 is moved over rough terrain.

Referring more specifically to FIG. 2 the walking beam 46, an elongated member having a downwardly open channel 56 formed therein (see FIG. 8), is characterized as having a forward end portion 58, a medial portion 60, and a rearward end portion 62. A spindle 64 is secured to the left side 18 of the main frame 12 for pivotally connecting the walking beam 46 to the left side 18 of the frame 12 so that the walking beam 46 is disposed in a substantially parallel, spatial relationship with the left side 18 of the frame 12 as shown. The pivotal attachment of the walking beam 46 to the left side 18 of the main frame 12 via the spindle 64 provides the walking beam 46 with a pivotation axis about a transverse axis of the main frame 12. When desired, a second walking beam (not shown) can be secured to the left side 18 of the main frame 12 so that the two walking beams are in tandem. In such instances two identical walking beams are secured to the right side (not shown) of the main frame 12 in an identical manner. In most instances the seismic exploration vehicle 10 will have at least two walking beams, such as walking beam 46, pivotally connected to each side of the frame, such as the left side 18 of the frame 12. Thus, as least four bogies, such as bogies 28, 30, 32 and 34 (see FIG. 1) are disposed on the inside perimeter of each of the endless tracks of the two track assemblies of the vehicle, such as the endless track 22 of the track assembly 20, for maintaining the endless track 22 in proper alignment and for supporting the vehicle 10.

As previously indicated the walking beam 46 is an elongated member having the downwardly open channel 56 extending therethrough for receiving the forward bogie arm 48, the first biasing member 50, the rearward bogie arm 52, and the second biasing member 54. As more clearly illustrated in FIGS. 5 and 6, the walking beam 46 of the suspension assembly 36 comprises a first web 66, a second web 68, and an upper web 70. The first web 66 of the walking beam 46 is disposed generally perpendicularly to the axis of pivotation of the walking beam 46 and is characterized as having a first end portion 72, a medial portion 74, and an opposed second end portion 76. The second web 68 of the walking beam 46 is positioned substantially parallel to the first web 66 and spaced a distance 78 therefrom. The second web 68 of the walking beam 46 is also characterized as having a first end portion 80, a medial portion 82, and an opposed second end portion 84. The upper web 70 of the walking beam 46 is disposed between and connected to the first and second webs 66, 68 so that the downwardly open channel 56 (illustrated in FIG. 8) of the walking beam 46 is formed therebetween. The upper web 70 of the walking beam 46 is also an elongated member having a first end portion 85 and an opposed second end portion 87.

The first web 66 of the walking beam 46 is provided with a plurality of apertures 86, 88 positioned in the medial portion 74 thereof substantially as shown in FIG. 5 of the drawings; and the second web 68 is provided with a plurality of apertures 90, 92 in the medial portion 82 thereof as illustrated by phantom line in FIG. 6 of the drawings. The aperture 90 in the second web 68 is aligned with the aperture 86 in the first web 66 and adapted to receive a pivot pin 94 (see FIG. 2 and 6). Thus, the forward bogie arm 48 (disposed in the downwardly open channel 56 formed by the first web 66, the second web 68 and the upper web 70) can be pivotally connected to the first and second web 66, 68 of the walking beam 46 via the pivot pin 94. Similarly, the aperture 92 in the second web 68 is aligned with the aperture 88 in the first web 66 and adapted to receive a pivot pin 96 (see FIGS. 2 and 6). Thus, the rearward bogie arm 52 (disposed in the downwardly open channel 56 formed by the first web 66, the second web 68 and the upper web 70) can be pivotally connected to the first and second web 66, 68 of the walking beam 46 via the pivot pin 96 so that the rearward bogie arm 52 extends in a direction opposite the forward bogie arm 48.

The first web 66 of the walking beam 46 is further provided with a third aperture 98 in the medial portion 74 thereof, the third aperture 98 being positioned substantially intermediate the apertures 86, 88 formed in the first web 66. The second web 68 is similarly provided with a third aperture 100 (illustrated by phantom lines in FIG. 6) in the medial portion 82 thereof, the third aperture 100 being positioned substantially intermediate the apertures 90, 92 in the second web 68 and aligned with the third aperture 98 of the first web 66. Thus, the apertures 98, 100 of the first and second web 66, 68, respectively, are adapted to receive the spindle 64 for pivotally connecting the first and second web 66, 68 of the walking beam 46 to the side of the main frame 12, such as the left side 18 thereof. As is evident from above, in order to pivotally connect the walking beam 46 to the side of the rigid main frame 12, such as the left side 18 thereof, the spindle 64 is connected to the left side 18 of the frame 12 so that the spindle 64 is disposed generally perpendicularly to the elongated axis of the frame substantially as shown in FIG. 2.

As previously stated the forward bogie arm 48 is pivotally connected to the first and second web 66, 68 of the walking beam 46 via the pivot pin 94 and the apertures 86, 90 formed in the first and second webs respectively. Similarly, the rearward bogie arm 52 is pivotally connected to the first and second webs 66, 68 of the walking beam 46 via the apertures 88, 92 in the first and second webs 66, 68, respectively, and the pivot pin 96. The pivot pins 94, 96 employed to pivotally connect the forward and rearward bogie arms 48, 52 to the first and second webs 66, 68 of the walking beam 46 are identical in construction. Thus, only pivot pin 96 for pivotally connecting one end 114 of the rearward bogie arm 54 to the first and second webs 60, 68 of the walking beam 46 will be discribed in detail with reference to FIG. 8.

The pivot pin 96 comprises an elongated cylindrical shaped body member 102 having a first end 104 and an opposed second end 106. A flange 108 is secured to the first end 104 of the pivot pin 94 and is adapted to abut and be secured to the adjacent portion of the first web 66 defining the aperture 88 therein. Thus, the rearward bogie arm 54 can be secured in the downwardly open channel 56 of the walking beam 46 by positioning the opposed second end 106 of the elongated cylindrical shaped member 102 of the pivot pin 96 through the apertures 88, 92 of the first and second webs 66, 68, so that the elongated cylindrical shaped body member 102 of the pivot pin 96 operably engages one end 114 of the rearward bogie arm 54 in a manner to be discussed in more detail hereinafter. The flange 108 secured to the first end 104 of the elongated cylindrical shaped body member 102 of the pivot pin 96 can be secured to the adjacent portion of the first web 66 of the walking beam 46 by any suitable means such as welding, bolting and the like.

As previously stated the forward bogie arm 48 and the rearward bogie arm 52 of the suspension assembly 36 are pivotally connected to the first and second webs 66, 68 of the walking beam 46 such that each of the forward and rearward bogie arms 48, 52 have a pivotation axis substantially parallel to the pivotation axis of the walking beam 46; and the forward and rearward bogie arms 48, 52 each have a bogie, such as bogies 28, 30 rotatably connected thereto. As more clearly illustrated in FIGS. 2-6 the forward bogie arm 48 is characterized as having one end 110 pivotally connected to the first and second web 60, 68 of the walking beam 46 and a distal end 112 positioned a distance 113 below the forward end portion 58 of the walking beam 46, i.e. the distance 113 below the first end portion 72 of the first web 66, and the first end portion 80 of the second web 68 substantially as shown in FIG. 3 and 5 of the drawings.

The rearward bogie arm 54, which is identically in construction to the forward bogie arm 48, but attached to the walking beam 46 such that the forward and rearward bogie arms 48, 52 are movable independently of each other, is characterized as having the one end 114 pivotally connected to the first and second web 66, 68 of the walking beam 46 and a distal end 116 positioned a distance 117 below the rearward end portion 62 of the walking beam 46, i.e., the distance 117 below the opposed second end portion 76 of the first web 66 and the opposed second end portion 84 of the second web 68 substantially as shown in FIG. 5.

The forward bogie arm 48 and the rearward bogie arm 52, although pivotally connected to the walking beam 46 such that the vertical movement of each of the forward and rearward bogie arms 48, 52 are independent of one another, are substantially identical in construction. Thus, the rearward bogie arm will be described in detail with reference to FIG. 8.

The rearward bogie arm 54, illustrated as an elongated member having the one end 114, a medial portion 118, and the distal end 116 is, as previously stated, pivotally connected via the one end 114 thereof to the medial portion 60 of the walking beam 46 such that the distal end 116 of the rearward bogie arm 54 is disposed the distance 117 below the rearward end portion 62 of the walking beam 46. It should be noted that the distance 117 between the rearward end portion 62 of the walking beam 46 and the distal end 116 of the rearward bogie arm 54 is representative of the distance between such components when the walking beam 46 and the rearward bogie arm 54 are disposed in a normal position, i.e. the elongated axis of the walking beam 46 and the rearward bogie arm 54 are positioned substantially parallel to each other as illustrated in FIG. 5. Similarly, the distance 113 between the forward end portion 62 of the walking beam 46 and the distal end 112 of the forward bogie arm 54 is representative of the distance between such components when same are normally disposed as illustrated in FIG. 5.

The pivotal attachment of the one end 114 of the rearward bogie arm 52 to the first and second webs 66, 68 of the walking beam 46 (via the aligned apertures 88, 92 in the first and second webs 66, 68 and the pivot pin 96 as heretofore described) will now be more fully described with reference to FIG. 8 of the drawings. As illustrated in FIG. 8, the one end portion 114 of the rearward bogie arm 52 is provided with a bore 120 extending therethrough. The bore 120 in the one end 114 of the rearward bogie arm 52 is positioned therein so that the bore 120 has a longitudinal central axis substantially normally disposed to the elongated axis of the rearward bogie arm 52. Similarly, the distal end 116 of the rearward bogie arm 52 is provided with a bore 122 extending therethrough. The bore 122 in the distal end 116 of the rearward bogie arm 52 has a longitudinal central axis substantially normally disposed to the elongated axis of the rearward bogie arm 54; and the longitudinal central axis of the bore 122 in the distal end 116 of the rearward bogie arm 52 is substantially parallel to the longitudinal central axis of the bore 120 in the one end 114 of the rearward bogie arm 52.

The bore 122 in the distal end 116 of the rearward bogie arm 52 is adapted to receive a stub axle 124 for rotational connection of a bogie, such as bogie 30 thereto, via a wheel hub assembly 126. Similarly, the distal end portion 112 of the forward bogie arm 48 (see FIGS. 5 and 6) is provided with a bore 127 in the distal end 112 there of. The bore 127 in the distal end 112 of the forward bogie arm 48 is adapted to receive a stub axle 128 for rotational connection of a bogie, such as bogie 28, thereto via a wheel hub assembly 130. The connecting of bogies to a stub axle via wheel hubs is well known in the art and thus a detailed description thereof is not believed required herein in order to fully describe the improved suspension assembly 36 of the present invention.

The forward bogie arm 48 and the rearward bogie arm 52 are, as previously indicated, substantially identical in construction and the forward and rearward bogie arms 48, 52 can be fabricated of any suitable material having the necessary strength to support the vehicle 10 via the track assembly. However, desirable results have been obtained when the forward and rearward bogie arms 48, 52 are provided with the configuration illustrated in FIG. 8.

As illustrated in FIG. 8 the rearward bogie arm 54 is an elongated member having tubular member 132 forming the one end 114, tubular member 134 forming the medial portion 118, and tubular member 136 forming the distal end 116. Thus, the tubular member 132 forming the one end 114 of the rearward bogie arm 52 defines a pivot pin support having the bore 120 extending therethrough so that the pivot pin 96 can pivotally connect the one end 114 of the rearward bogie arm 52 to the first and second webs 66, 68 of the walking beam 46.

The tubular member 132 forming the one end 114 of the rearward bogie arm 52 and having the bore 120 therein also provides a bearing support adapted to receive a bearing 138. Resilient seals 140, 142 are positioned within the bore 120 in the tubular member 132 forming the one end 114 of the rearward bogie arm 52 so as to be disposed adjacent the ends of the bearing 138 substantially as shown. The resilient seals 140, 142 are conventional seals. However, the seals 140, 142 are inverted when positioned in the bore 120 of the tubular member 132 so that the seals 138, 140 prevent dirt from ingressing into the bearing surface defined by tubular member 132. Such seals are well known in the art, as well as the technique of inverting the seals to prevent dirt from entering into a bushing assembly. Thus, no further comments of the relationship of the bearing 138 the seals 140, 142, the pivot pin 96 and the bore 120 formed in the tubular member 132 forming the distal end 114 of the rearward bogie arm 52 are believed necessary.

Referring to FIGS. 7 and 8, the tubular member 136 (which forms the distal end 116 of the rearward bogie arm 52 having the bore 122 extending therethrough) receives the stub axle 124 (via the bore 122) for rotatably mounting the wheel hub assembly 126 and the bogie 30. The stub axle 124 can be secured to the tubular member 136 by any suitable means, such as plate 147 and lug bolts 149. The connections of a stub axle, to a tubular member, such as stub axle 126 to the tubular member 136 forming the distal end 116 of the rearward bogie arm 52, are well known in the vehicle construction art. Thus, no further comments as to the connection of the stub axle 126 to the distal end 116 of the rearward bogie arm 52 is believed necessary.

As more clearly illustrated in FIGS. 3, 4 and 5 the first biasing member 50 of the suspension assembly 36 is disposed between the distal end 112 of the forward bogie arm 48 and the forward end portion 58 of the walking beam 46 such that the first biasing member 50 biases the bogie 28 rotatably mounted on the distal end 112 of the forward bogie arm 48 in a downward direction; and the second biasing member 54 is disposed between the distal end 116 of the rearward bogie arm 52 and the rearward end portion 62 of the walking beam 46 such that the second biasing member 54 biases the bogie 30 rotatably mounted on the distal end 116 of the rearward bogie arm 52 in a downward direction.

The first biasing member 50, depicted as an air bag or pneumatic spring, is provided with an upper end 143 having a plate 144 secured thereto, and a lower end 146 having a plate 148 secured thereto. Similarly, the second biasing member 54, also depicted as a pneumatic spring or air bag, is provided with an upper end 150 having a plate 152 connected thereto, and a lower end 154 having a plate 156 connected thereto. In an assembled position the plate 144 secured to the upper end 143 of the first biasing member 50 is disposed adjacent the first end portion 85 of the upper web 70 of the walking beam 46 and secured thereto; and the plate 148 secured to the lower end 146 of the first biasing member 50 is connected to the tubular member 132 forming the distal end 112 of the forward bogie arm 48. Thus, the first biasing member 50 connects the distal end 112 of the forward bogie arm 48 to the first end portion 85 of the upper web 70 of the walking beam 46; and the first biasing member 50 biases the bogie 28 rotatably mounted on the distal end 112 of the forward bogie arm 48 in the downward direction.

In like manner, the plate 152 secured to the upper end 150 of the second biasing member 54 is disposed adjacent the opposed second end portion 87 of the upper web 70 of the walking beam 46 and secured thereto; and the plate 156 secured to the lower end 154 of the second biasing member 54 is connected to the tubular member 136 forming the distal end 116 of the rearward bogie arm 52. Thus, the second biasing member 54 connects the distal end 116 of the rearward bogie arm 52 to the opposed second end portion 87 of the upper web 70 of the walking beam 46; and the second biasing member 54 biases the bogie 30 rotatably mounted on the distal end 116 of the rearward bogie arm 52 in the downward direction.

Any suitable means can be employed for connecting plates 144, 148, on the upper and lower ends 143, 146 of the first biasing member 50 to the first end portion 85 of the upper web 70 of the walking beam 46 and the distal end 112 of the forward bogie arm 48, respectively; and any suitable means can be likewise be employed for connecting the plates 152, 156 on the upper and lower ends 150, 154 of the second biasing member 54 to the opposed second end portion 87 of the upper web 70 of the walking beam 46 and the distal end 116 of the rearward bogie arm 52, respectively, such as bolts, welding and the like. The connection of biasing members, such as air bags, to adjacently disposed elements is well known in the art. Therefore, a detailed description of the connecting means for securing the first and second biasing members 50, 54 to the walking beam 46 and the forward and rearward bogie arms 48, 52 is not required herein.

The improved suspension assembly 36 further comprises a first support member 158 and a second support member 160. The first support member 158 is disposed between the distal end 112 of the forward bogie arm 48 and the plate 148 connected to the lower end 146 of the first biasing member 50; and the second support member 160 is disposed between the distal end 116 of the rearward bogie arm 52 and the plate 156 connected to the lower end 154 of the second biasing member 54. Thus, the first support member 158 is disposed a distance below the forward end portion 58 of the walking beam 46 and the first support member 158 is of a size sufficient to receive the plate 148 secured to the lower end 146 of the first biasing member 50 so that the first biasing member 50 can be secured thereto. Similarly, the second support member 116 is disposed a distance below the rearward end portion 62 of the walking beam 46 and is adapted to receive the plate 156 secured to the lower end 154 of the second biasing member 54 so that the second biasing member 54 can be secured to the second support member 160.

In order to further stabilize the first and second biasing members 50, 54 with respect to the walking beam 46 the first and opposed second end portions 85, 87 of the upper web 70 of the walking beam 46 are each provided with a generally circular configuration which substantially corresponds in diameter to the diameter of the first and second biasing members 50, 54 and the plates 144, 152 secured to the upper end 143, 150 of the first and second biasing members 50, 54, respectively. Further, the first end portions 72, 80 of the first and second web 66, 68 of the walking beam 44, as well as the opposed second end portions 76, 84 of the first and second web 66, 68, are each provided with a convex, arcuate configuration corresponding to at least a portion of the circular configuration of the first and second end portions 85, 87 of the upper web 70 so that in the assembled position the first end portions 72, 80 of the first and second webs 66, 68 cooperate to at least partially enclose an upper portion of the first biasing member 50 substantially as shown in FIGS. 2, 5 and 6; and the opposed second end portions 76, 84 of the first and second web 66, 68 cooperate to at least partially enclose an upper portion of the second biasing member 54 substantially as shown in FIGS. 2, 5 and 6.

In order to restrict the vertical movement of the distal end 112 of the forward bogie arm 48 (and the bogie 28 rotatably mounted thereon), and the distal end 116 of the rearward bogie arm 52 (and the bogie 28 rotatably mounted thereon) the suspension assembly 36 further comprises a first bogie retainer assembly 162 secured to the walking beam 46 for selectively engaging the forward bogie arm 48 and restricting the vertical movement of the distal end 112 of the forward bogie arm 48 within perimeters defined by the first bogie arm retainer assembly 162. Similarly, a second bogie arm retainer assembly 164 is secured to the walking beam 46 for selectively engaging the rearward bogie arm 52 and restricting the vertical movement of the distal end 116 of the rearward bogie arm 52 within perimeters defined by the second bogie arm retainer assembly 164.

As illustrated by phantom lines in FIG. 5 the first bogie arm retainer assembly 162 comprises an upper member 166 and a spatially disposed lower member 168. The upper member 166 is secured to the medial portion 60 of the walking beam 46 so as to transverse a portion of the downwardly open channel 56 formed between the first and second webs 66, 68. The upper member 166, which is thus secured to the first and second webs 66, 68 of the walking beam 46, is angularly disposed a selected distance above the forward bogie arm 48 when the forward bogie arm 48 is in a normal position and the walking beam 46 and the forward bogie arm 48 are substantially parallel to the side of the frame 12.

The lower member 168 of the first bogie arm retainer assembly 162 is disposed within the downwardly open channel 56 of the walking beam 46 formed by the first and second web 66, 68 so as to transverse a portion of the downwardly open channel 56 a selected distance below the medial portion of the forward bogie arm 48 when the forward bogie arm 48 is in the normal position as shown. The lower member 168 is also angularly disposed such that the upper and lower members 166, 168 diverge from each other in the direction of the forward end portion 58 of the walking beam 46. Thus, the upper member 166 of the first bogie arm retainer assembly 162 is substantially parallel to and abuts the medial portion of the forward bogie arm 48 when the forward bogie arm 48 is selectively moved to an uppermost vertical position; and the lower member 168 of the first bogie arm retainer assembly 162 is substantially parallel to and abuts the medial portion of the forward bogie arm 48 when the forward bogie arm 48 is selectively moved to a downward-most vertical position. Therefore, the angular diposition of the upper and lower members 166, 168 of the first bogie arm retainer assembly 162 restrict the vertical movement of the forward bogie arm 48 and thus the bogie 28 rotatably connected to the distal end 112 of the forward bogie arm 48.

The second bogie arm retainer assembly 164 is substantially identical in construction and operation to the before-described first bogie arm retainer assembly 164. Thus, the second bogie arm retainer assembly comprises upper member 170 and a spatially disposed lower member 172. The upper member 170 is secured to the medial portion 60 of the walking beam 46 a distance from the first bogie arm retainer assembly 162 so that the upper member 170 transverses a portion of the downwardly open channel 56 formed between the first and second webs 66, 68 of the walking beam 46. The upper member 170, which is secured to the first and second webs 66, 68 of the walking beam 46, is angularly disposed a selected distance above the rearward bogie arm 52 when the rearward bogie arm 52 is in a normal position and the walking beam 46 and the rearward bogie arm 52 are substantially parallel to the side of the frame 12.

The lower member 172 of the second bogie arm retainer assembly 162 is disposed within the downwardly open channel 56 of the walking beam 46 formed by the first and second webs 66, 68 so as to transverse a portion of the downwardly open channel 56 a selected distance below the medial portion of the rearward bogie arm 52 when the rearward bogie arm 52 is in the normal position as shown. The lower member 172 is also angularly disposed such that the upper and lower members 170, 172 diverge from each other in the direction of the rearward end portion 62 of the walking beam 46. Thus, the upper member 170 of the second bogie arm retainer assembly 164 is substantially parallel to and abuts the medial portion of the rearward bogie arm 52 when the rearward bogie arm 52 is selectively moved to an uppermost vertical position; and the lower member 172 of the second bogie arm retainer assembly 164 is substantially parallel to and abuts the medial portion of the rearward bogie arm 52 when the rearward bogie arm 52 is selectively moved to a downward-most vertical position. Therefore, the angular disposition of the upper and lower members 170, 172 of the second bogie arm retainer assembly 164 restrict the vertical movement of the rearward bogie arm 52 and thus the bogie 30 rotatably connected to the distal end 116 of the rearward bogie arm 52.

Because of the stress resulting from the load placed on the pivotal connection of the one end 110 of the forward bogie arm 48 and the one end 114 of the rearward bogie arm 52 (as well as the pivotal attachment of the walking beam 46 to the substantially rigid main frame 12 of the vehicle 10), it is often desirable to secure reinforcing structures to the first and second webs 66, 68 forming the walking beam 46. Any suitable means can be employed to reinforce the stress areas of the suspension assembly 36, such as a plurality of reinforcing plates secured to the first and second webs 66, 68 of the walking beam 46.

To illustrate the use of support plates to reinforce the stress areas created in the walking beam 46 reference is now made more specifically to FIGS. 2, 5 and 6 of the drawings. To reinforce the stress area for the pivotal attachment of the one end 110 of the forward bogie arm 48 to the first and second webs 66, 68 of the walking beam 46 and the one end 114 of the rearward bogie arm 52 to the first and second webs 66, 68 of the walking beam 46, a plurality of substantially U-shaped reinforcing plates, such as reinforcing plate 180, 181 (see FIGS. 2, 5 and 6) are secured to the first and second webs 66, 68, respectively, of the walking beam 46. The substantially U-shaped reinforcing plates 180, 181 are substantially identical in construction and use. Therefore, only reinforcing plate 180, is illustrated more clearly in FIGS. 2 and 5, will be described in detail.

The reinforcing plate 180 is provided with a first aperture 182 and a spatially disposed second aperture 184. The first aperture 182 of the reinforcing plate 180 is alignable with the first aperture 86 of the first web 66; and the second aperture 184 of the reinforcing plate 180 is alignable with the second aperture 88 in the first web 66 when the reinforcing plate 180 is secured to the first web 66 of the walking beam 46. Further, it should be noted that the U-shaped configuration of the reinforcing plate 180 does not restrict the third aperture 98 formed in the first web 66. Thus, the walking beam 46 can be pivotally connected to the side of the frame 12 via the spindle 64 and the third opening 98, 100 formed in the first and second webs 66, 68 as heretofore described.

In order to further strengthen the walking beam 46 of the suspension assembly 36, as well as the pivotal attachment of the walking beam 46 to the side of the frame 12 via the third apertures 98, 100 of the first and second webs 66, 68 of the walking beam 46 and the spindle 64, second reinforcing plates, 186, 187 can be secured to the first and second webs 66, 68 of the walking beam 46. The second reinforcing plates 186, 187 are identical in construction. Thus, only the second reinforcing plate 186 will be described in detail with reference in FIG. 5 of the drawings.

The second reinforcing plate 186 is illustrated as a substantially triangular shaped member having a plurality of apertures, 188, 190 and 192 (illustrated by phantom lines in FIG. 6) which are alignable with the first, third and second apertures, 86, 98, and 88, respectively, of the first web 66 when the second reinforcing plate 186 is secured to the first web 66 of the walking beam 46. In addition, a tubular member 194 can be disposed in the aligned third apertures 98, 100 of the first and second webs 66, 68 of the walking beam 46 (and the third apertures of the second reinforcing plates, such as the third aperture 190 of the second reinforcing plate 186) for pivotal connection of the walking beam 46 to the spindle 64 secured to the rigid main frame 12. The tubular member 194, in addition to aiding in the pivotal attachment of the walking beam 46 to the spindle 64 also strengthens the walking beam 46 at the place of pivotal attachment of the walking beam 46 to the side of the rigid main frame 12 via the spindle 64.

The pivotal attachment of the walking beam 46 to the rigid main frame 12 can be accomplished by any suitable means. For example, and as more clearly illustrated in FIG. 7, the pivotal connection of the walking beam 46 to the spindle 64 can readily be achieved by milling the inner surface of the tubular member 194 to have a configuration substantially as shown so that a plurality of seals, such as resilient seals 196 and 198 can be disposed therein for sealing engagement with the spindle 64. A plurality of bearings, such as inner brass bearing 200 and outer brass bearings 202, are disposed in the tubular member 194 at a position between the seals 196 and 198. Thus, the inner and outer brass bearings 200 and 202 carry the load of the walking beam 46 and allow the walking beam 46 to pivot on the spindle 64. A thrust bearing 204 is disposed within the tubular member 194 at a position between the inner and outer brass bearings 200, 202 and the outwardly extending end portion of the tubular member 194 is enclosed by any suitable means, such as an end cap 206. The end cap 206 can be secured to the outwardly extending end portion of the spindle 64 by any suitable means known in the art. For example, and as illustrated in FIG. 2, the outwardly extending end portion of the spindle 64 can be provided with a plurality of threaded bores 205 each of which is adapted to threadably receive a threaded bolt, such as a lug bolt. The end cap 206 is likewise provided with a plurality of apertures 207 therein, which are alignable with the threaded bores 205 in the outwardly extending end portion of the spindle 64, so that the end cap 206 can be secured to the spindle 64 by the lug bolts (not shown). The end cap 206 is of a sufficient diameter so that the end cap 206 engages the outwardly extending end portion of the tubular member 194, or the portion of the first web 66 defining the third opening 98 therein, so that the walking beam 46 can be pivotally connected to the side of the frame 12 via the spindle 64.

In addition to the before-mentioned reinforcing structures employed to strengthen the areas of stress of the walking beam 46 (such as first reinforcing plates 180, 181, second reinforcing plates 186, 187 and tubular member 194) a plurality of third reinforcing members, such as members 208, 210, can be mounted on the first end portion 85 of the upper web 70 so as to extend between the first end portions 72, 80 of the first and second webs 66, 68 of the walking beam 46; and a plurality of fourth reinforcing members, such as members 212, 214, can be mounted on the opposed second end portion 87 of the upper web 70 so as to extend between the opposed second end portions 76, 84 of the first and second webs 66, 68 of the walking beam 46. Thus, as pressure is exerted on the first end portion 85 or the opposed second end portion 87 of the upper web 70 of the walking beam 46 because of compression of the first biasing member 50 or the second biasing member 54, the reinforcing members 208, 210 reinforce the forward end portion of the walking beam 46, and the reinforcing member 212, 214 reinforce the rearward end portion of the walking beam 46.

From the description of the improved suspension assembly 36 set forth hereinbefore it is readily apparent that the unique construction and interconnection of the walking beam 46, the forward bogie arm 48, the rearward bogie arm 52, in combination with the first and second biasing members 50, 54 enables one to connect bogies 28, 30 of the track assembly 20 to the forward and rearward bogie arms, respectively, and the movement of the bogies 28, 30 are independent of each other, as well as the pivotation of the walking beam 46.

It is also apparent from the above description that the improved suspension assembly 36 of the present invention enables the bogies 28, 30 of the track assembly 20 to be vertically movable within restricted limits independent of any other bogie of the track assembly 20, whether the bogie is an adjacently disposed bogie or a bogie disposed on the opposite side of the vehicle 12. Futher, the unique design of the improved suspension assembly 36 of the present invention reduces vibrations resulting from the movement of the seismic exploration vehicle.

The present invention is well adapted to carry out the objects and obtain the ends and advantages mentioned herein as well as those inherent in the invention. While a presently preferred embodiment of the invention has been described for purposes of this disclosure, numerous changes may be made which will readily suggest themselves to those skilled in the art and which are accomplished within the spirit of the invention disclosed and as defined in the appended claims.

What is claimed is:

1. In a tracked vehicle having a substantially rigid main frame supported and moved by track assemblies disposed along opposing sides of the frame, each of the track assemblies including an endless track, at least one drive sprocket and a plurality of bogies disposed on the inside perimeter of the track to maintain the track in proper alignment and to support the vehicle, the improvement being a suspension assembly for connecting the bogies to the frame which comprises:

a walking beam having a forward end portion, a medial portion, and a rearward end portion, the medial portion of the walking beam pivotally connected to one side of the frame in a substantially parallel, spatial relationship with the side of the frame such that the walking beam is provided with a pivotation axis about a transverse axis of the main frame;

a forward bogie arm having one end and a distal end, said one end pivotally connected to the walking beam such that the forward bogie arm has a pivotation axis substantially parallel to the pivotation axis of the walking beam, said distal end having a bogie rotatably mounted thereon;

a first biasing means disposed between said distal end of the forward bogie arm and the walking beam for biasing the bogie thereon in a downwardly direction;

a rearward bogie arm having one end and a distal end, said one end pivotally connected to the walking beam such that the rearward bogie arm has a pivotation axis substantially parallel to the pivotation axis of the walking beam, said distal end having a bogie rotatably mounted thereon; and a second biasing means disposed between said distal end of the rearward bogie arm and the walking beam for biasing the bogie thereon in a downward direction;

wherein each of the forward and rearward bogie arms comprises:

a first tubular member having a cylindrical shaped bore extending therethrough, the first tubular member forming said one end of each of the forward and rearward bogie arms; and a second tubular member having a cylindrical shaped bore extending therethrough, the second tubular member forming the distal end of each of the forward and rearward bogie arms.

2. The vehicle of claim 1 wherein the first biasing means comprises a first air bag having an upper end and a lower end, and the second biasing means comprises a second air bag having an upper end and a lower end.

3. The vehicle of claim 2 wherein the suspension assembly further comprises:

a first support member secured to said distal end of the forward bogie arm such that the first support member is disposed a distance below the first end portion of the walking beam;

a second support member secured to said distal end of the rearward bogie arm such that the second support member is disposed a distance below the second end portion of the walking beam; and securing means for connecting the upper end of the first air bag to the first end portion of the walking beam, the lower end of the first air bag to the first support member, the upper end portion of the second air bag to the second end portion of the walking beam, and the lower end of the second air bag to the second support member.

4. The vehicle of claim 1 wherein at least two walking beams are pivotally connected in tandem to each side of the frame such that at least four bogies are disposed on the inside perimeter of the track and wherein each of the walking beams comprises:
- a first web disposed generally perpendicularly to the axis of pivotation of the walking beam, the first web having a first end portion, a medial portion, and an opposed second end portion;
- a second web substantially parallel to the first web and spaced a distance therefrom, the second web having a first end portion, a medial portion, and an opposed second end portion; and
- an upper web interconnecting the first and second webs so as to provide the walking beam with a general form of a downwardly opening channel adapted to receive therein the forward bogie arm, the rearward bogie arm, the first biasing means, and the second biasing means of the suspension assembly.

5. The vehicle of claim 4 wherein the upper web of the walking beam is characterized as having a first end portion, a medial portion, and a second end portion and said one end of each of the forward and rearward bogie arms is provided with a bore extending therethrough, the bores in said one end of each of the forward and rearward bogie arms having a longitudinal central axis substantially normally disposed to the elongated axis of each of the bogie arms, and wherein the suspension assembly further comprises:
- first pivot means disposed between and connected to the first and second webs of the walking beam for pivotally connecting said one end of the forward bogie to the first and second webs, the first pivot means adapted to engage the bore in said one end of the forward bogie arm so that the forward bogie arm is disposed in a first end portion of the channel of the walking beam and said distal end of the forward bogie arm is spaced a distance below the first end portion of the upper web of the walking beam; and
- second pivot means disposed between and connected to the first and second webs of the walking beam for pivotally connecting said one end of the rearward bogie to the first and second webs, the second pivot means adapted to engage the bore in said one end of the rearward bogie arm so that the rearward bogie arm is disposed in an opposed second end portion of the channel of the walking beam and said distal end of the rearward bogie arm is spaced a distance below the second end portion of the upper web of the walking beam.

6. The vehicle of claim 5 wherein each of the first and second end portions of the upper web is provded with a generally circular configuration, and the first end portions of the first and second webs and the opposed second end portions of the first and second webs are each provided with a convex arcuate configuration corresponding to at least a portion of the circular configuration of the first and second end portions of the upper web such that in an assembled position the first end portions of the first web, the second web and the upper web cooperate to at least partially enclose an upper portion of the first biasing means and the second end portions of the first web, the second web, and the upper web cooperate to at least partially enclose an upper portion of the second biasing means.

7. The vehicle of claim 6 wherein the first biasing means comprises a first air bag having an upper end and a lower end, and the second biasing means comprises a second air bag having an upper end and a lower end, the lower end of the first air bag being connected to said distal end of the forward bogie arm, and the upper end of the first air being connected to the first end portion of the upper web of the walking beam such that the convex arcuate shaped first end portions of the first and second webs of the walking beam partially enclose a portion of the first air bag disposed adjacent the upper end thereof, the lower end of the second air being connected to said distal end of the rearward bogie arm and the upper end of the second air bag being connected to the second end portion of the upper web of the walking beam such that the convex arcuate shaped second end portions of the first and second webs of the walking beam partially enclose a portion of the second air bag disposed adjacent the upper end thereof.

8. The vehicle of claim 7 wherein the suspension assembly further comprises:
- a first air bag support mounted on an upper side of said distal end of the forward bogie arm, the first air bag support being disposed a distance below the first end portions of the first web, the second webs and the upper web, the first air bag support adapted to receive and support the first end of the first air bag;
- a second air bag support mounted on an upper side of said distal end of the rearward bogie arm, the second air bag support being disposed a distance below the second end portions of the first web, the second web and the upper web, the second air bag support adapted to receive and support the first end of the second air bag;
- means for connecting the upper end of the first air bag to the first end portion of the upper web of the walking beam, the lower end portion of the first air bag to the first support member, the upper end of the second air bag to the second end portion of the upper web of the walking beam, and the lower end of the second air bag to the second air bag support.

9. The vehicle of claim 5 wherein each of the first and second webs of the walking beam is provided with a plurality of apertures in the medial portion thereof, a first aperture in the first web being aligned with a first aperture in the second web, a second aperture in the first web being aligned with a second aperture in the second web and wherein the first pivot means comprises:
- an elongated first pivot pin having a first end and an opposed second end; and
- a first flange secured to the first end of the first pivot pin and adapted to abut and be secured to the adjacent portion of the first web defining the first aperture therein when the first pivot pin is positioned, via the opposed second end thereof, through the first apertures of the first and second webs and the bore in said one end of the forward bogie arm;

and wherein the second pivot means comprises:
- an elongated second pivot pin having a first end and an opposed second end; and
- a second flange secured to the first end of the second pivot pin and adapted to abut and be secured to the adjacent portion of the first web defining the second aperture therein when the second pivot pin is positioned, via the opposed second end thereof, through the second apertures of the first and second webs and the bore in said one end of the rearward bogie arm.

10. The vehicle of claim 9 wherein the first and second webs are each provided with a third aperture in the medial portion thereof, the third apertures being aligned and positioned substantially intermediate the first and second apertures in the first and second webs and wherein the suspension assembly further comprises:

a spindle connected to the side of the frame such that the spindle is disposed generally perpendicularly to the elongated axis of the frame, the spindle being adapted to be positioned through the third apertures of the first and second web for pivotally connecting the walking beam to the side of the frame of the vehicle.

11. The vehicle of claim 10 wherein the walking beam further comprises:

a substantially U-shaped first reinforcing plate secured to the medial portion of the first web, the first reinforcing plate having a first and second aperture formed therein such that in the assembled position the first aperture of the reinforcing plate is aligned with the first aperture of the first web, the second aperture of the first reinforcing plate is aligned with the second aperture of the first web and the third aperture in the first web is substantially unrestricted by the first reinforcing plate; and a substantially U-shaped second reinforcing plate secured to the medial portion of the second web, the second reinforcing plate having a first and second aperture therein such that in the assembled position the first aperture of the second reinforcing plate is aligned with the first aperture of the second web, the secnd aperture of the second reinforcing plate is aligned with the second aperture of the second web and the third aperture in the second web is substantially unrestricted by the second reinforcing plate.

12. The vehicle of claim 1 wherein the suspension assembly further comprises:

bearing means disposed within the cylindrical shaped bores of each of the first tubular members forming the one end of the forward and rearward bogie arms, said bearing means adapted to receive a pivot pin for pivotal connection of the one end of the forward and rearward bogie arms to the walking beams; and seal means for substantially sealing the cylindrical shaped bore of each of the first tubular members containing the bearing means of the forward and rearward bogie arms to prevent dirt from ingressing therein.

13. The vehicle of claim 9 wherein the suspension assembly further comprises:

a first bogie arm retainer means disposed within a first portion of the channel of the walking beam and secured to the first and second webs of the walking beam, the first bogie arm retainer means selectively engaging the forward bogie arm and restricting the vertical movement of said distal end of the forward bogie arm within perimeters defined by the first bogie arm retainer means; and a second bogie arm retainer means disposed within a second portion of the channel of the walking beam and secured to the first and second webs of the walking beam, the second bogie arm retainer means selectively engaging the rearward bogie arm and restricting the vertical movement of said distal end of the rearward bogie arm within perimeters defined by the second bogie arm retainer means.

14. The vehicle of claim 13 wherein each of the forward bogie arm and the rearward bogie arm is an elongated member having a substantially rectangular shaped medial portion, and wherein the first bogie arm retainer means comprises:

an upper member disposed between and connected to the first and second webs of the walking beam such that the upper member is angularly disposed a selected distance above the forward bogie arm when the forward bogie arm is in a normal position substantially parallel to the side of the frame; and a lower member disposed between and connected to the first and second webs of the walking beam such that the lower member is angularly disposed a selected distance below the medial portion of the forward bogie arm when the forward bogie arm is in the normal position, the upper and lower members diverging from each other in the direction of the first end portion of the first and second webs such that the upper member is substantially parallel to and abuts the medial portion of the forward bogie arm when same is selectively moved to an upper most vertical position and the lower member is substantially parallel to and abuts the medial portion of the forward bogie arm when same is selectively moved to a downward most vertical position;

and wherein the second bogie arm retainer means comprises:

an upper member disposed between and connected to the first and second webs of the walking beam such that the upper member is angularly disposed a selected distance above the rearward bogie arm when the rearward bogie arm is in a normal position substantially parallel to the side of the frame; and a lower member disposed between and connected to the first and second webs of the walking beam such that the lower member is angularly disposed a selected distance below the medial portion of the rearward bogie arm when the rearward bogie arm is in the normal position, the upper and lower members diverging from each other in the direction of the second end portions of the first and second webs such that the upper member is substantially parallel to and abuts the medial portion of the rearward bogie arm when same is selectively moved to an upper most vertical position and the lower member is substantially parallel to and abuts the medial portion of the rearward bogie arm when same is selectively moved to a downward most vertical position.

15. In a tracked vehicle having a substantially rigid main frame supported and moved by track assemblies disposed along opposing sides of the frame, each of the track assemblies including an endless track, at least one drive sprocket and a plurality of bogies disposed on the inside perimeter of the track to maintain the track in proper alignment and to support the vehicle, the improvement being a suspension assembly for connecting the bogies to the frame which comprises:

a walking beam having a forward end portion, a medial portion, and a rearward end portion, the medial portion of the walking beam pivotally connected to one side of the frame in a substantially parallel, spatial relationship with the side of the frame such that the walking beam is provided with a pivotation axis about a transverse axis of the main frame;

a forward bogie arm having one end and a distal end, said one end pivotally connected to the walking beam such that the forward bogie arm has a pivotation axis substantially parallel to the pivotation axis of the walking beam, said distal end having a bogie rotatably mounted thereon;

a first biasing means disposed between said distal end of the forward bogie arm and the walking beam for biasing the bogie thereon in a downwardly direction;

a rearward bogie arm having one end and a distal end, said one end pivotally connected to the walking beam such that the rearward bogie arm has a pivotation axis substantially parallel to the pivotation axis of the walking beam, said distal end having a bogie rotatably mounted thereon;

a second biasing means disposed between said distal end of the rearward bogie arm and the walking beam for biasing the bogie thereon in a downward direction;

a first bogie arm retainer means secured to the walking beam for selectively engaging the forward bogie arm and restricting the vertical movement of said distal end of the forward bogie arm within perimeters defined by the first bogie arm retainer means; and a second bogie arm retainer means secured to the walking beam for selectively engaging the rearward bogie arm and restricting the vertical movement of said distal end of the rearward bogie arm within perimeters defined by the second bogie arm retainer means;

wherein each of the forward bogie arm and the rearward bogie arm is an elongated member having a medial portion disposed between said one end and said distal end, and wherein the first bogie arm retainer means comprises:

an upper member secured to the medial portion of the walking beam a selected distance above the medial portion of the forward bogie arm when the forward bogie arm is in a normal position substantially parallel to the side of the frame; and a lower member secured to the medial portion of the walking beam a selected distance below the medial portion of the forward bogie arm when the bogie arm is in the normal position, the upper and lower members cooperating to define the vertical movement of the distal end of the forward bogie arm and thus the bogie rotatably mounted on said distal end of the forward bogie arm;

and wherein the second bogie arm retainer means comprises:

an upper member secured to the medial portion of the walking beam a selected distance above the medial portion of the rearward bogie arm when the rearward bogie arm is in a normal position and substantially parallel to the side of the frame; and a lower member secured to the medial portion of the walking beam a selected distance below the medial portion of the rearward bogie arm when the rearward bogie arm is in the normal position, the upper and lower members cooperating to define the vertical movement of the distal end of the rearward bogie arm and thus the bogie rotatably mounted on said distal end of the rearward bogie arm.

16. In a tracked vehicle having a substantially rigid main frame supported and moved by track assemblies disposed along opposing sides of the frame, each of the track assemblies including an endless track, at least one drive sprocket and a plurality of bogies disposed on the inside perimeter of the track to maintain the track in proper alignment and to support the vehicle, the improvement being a suspension assembly for connecting the bogies to the frame which comprises:

a walking beam having a forward end portion, a medial portion, and a rearward end portion, the medial portion of the walking beam pivotally connected to one side of the frame in a substantially parallel, spatial relationship with the side of the frame such that the walking beam is provided with a pivotation axis about a transverse axis of the main frame;

a forward bogie arm having one end and a distal end, said one end pivotally connected to the walking beam such that the forward bogie arm has a pivotation axis substantially parallel to the pivotation axis of the walking beam, said distal end having a bogie rotatably mounted thereon;

a first biasing means disposed between said distal end of the forward bogie arm and the walking beam for biasing the bogie thereon in a downwardly direction;

a rearward bogie arm having one end and a distal end, said one end pivotally connected to the walking beam such that the rearward bogie arm has a pivotaion axis substantially parallel to the pivotation axis of the walking beam, said distal end having a bogie rotatably mounted thereon;

a second biasing means disposed between said distal end of the rearward bogie arm and the walking beam for biasing the bogie thereon in a downward direction;

wherein at least two walking beams are pivotally connected in tandem to each side of the frame such that at least four bogies are disposed on the inside perimeter of the track and wherein each of the walking beams comprises:

a first web disposed generally perpendicularly to the axis of pivotation of the walking beam, the first web having a first end portion, a medial portion, and an opposed second end portion;

a second web substantially parallel to the first web and spaced a distance therefrom, the second web having a first end portion, a medial portion, and an opposed second end portion; and an upper web interconnecting the first and second webs so as to provide the walking beam with a general form of a downwardly opening channel adapted to receive therein the forward bogie arm, the rearward bogie arm, the first biasing means, and the second biasing means of the suspension assembly;

wherein the upper web of the walking beam is characterized as having a first end portion, a medial portion, and a second end portion and said one end of each of the forward and rearward bogie arms is provided with a bore extending therethrough, the bores in said one end of each of the forward and rearward bogie arms having a longitudinal central axis substantially normally disposed to the elongated axis of each of the bogie arms, and wherein the suspension assembly further comprises:

first pivot means disposed between and connected to the first and second webs of the walking beam for pivotally connecting said one end of the forward bogie to the first and second webs, the first pivot means adapted to engage the bore in said one end of the forward bogie arm so that the forward bogie arm is disposed in a first end portion of the channel of the walking beam and said distal end of the forward bogie arm is spaced a distance below the first end portion of the upper web of the walking beam; and second pivot means disposed between and connected to the first and second webs of the walking beam for pivotally connecting said one end of the rearward bogie to the first and second webs, the second pivot means adapted to engage the bore in said one end of the rearward bogie arm so that the rearward bogie arm is disposed in an opposed second end portion of the channel of the walking beam and said distal end of the rearward bogie arm is spaced a distance below the second end portion of the upper web of the walking beam;

wherein each of the first and second webs of the walking beam is provided with a plurality of apertures in the medial portion thereof, a first aperture in the first web being aligned with a first aperture in the second web, a second aperture in the first web being aligned with a second aperture in the second web and wherein the first pivot means comprises:

an elongated first pivot pin having a first end and an opposed second end; and a first flange secured to the first end of the first pivot pin and adapted to abut and be secured to the adjacent portion of the first web defining the first aperture therein when the first pivot pin is positioned, via the opposed second end thereof, through the first apertures of the first and second webs and the bore in said one end of the forward bogie arm;

and wherein the second pivot means comprises:

an elongated second pivot pin having a first end and an opposed second end; and a second flange secured to the first end of the second pivot pin and adapted to abut and be secured to the adjacent portion of the first web defining the second aperture therein when the second pivot pin is positioned, via the opposed second end thereof, through the second apertures of the first and second webs and the bore in said one end of the rearward bogie arm;

wherein the suspension assembly further comprises:

a first bogie arm retainer means disposed within a first portion of the channel of the walking beam and secured to the first and second webs of the walking beam, the first bogie arm retainer means selectively engaging the forward bogie arm and restricting the vertical movement of said distal end of the forward bogie arm within perimeters defined by the first bogie arm retainer means; and a second bogie arm retainer means disposed within a second portion of the channel of the walking beam and secured to the first and second webs of the walking beam, the second bogie arm retainer means selectively engaging the rearward bogie arm and restricting the vertical movement of said distal end of the rearward bogie arm within perimeters defined by the second bogie arm retainer means; and wherein each of the forward bogie arm and the rearward bogie arm is an elongated member having a substantially rectangular shaped medial portion, and wherein the first bogie arm retainer means comprises:

an upper member disposed between and connected to the first and second webs of the walking beam such that the upper member is angularly disposed a selected distance above the forward bogie arm when the forward bogie arm is in a normal position substantially parallel to the side of the frame; and a lower member disposed between and connected to the first and second webs of the walking beam such that the lower member is angularly disposed a selected distance below the medial portion of the forward bogie arm when the forward bogie arm is in the normal position, the upper and lower members diverging from each other in the direction of the first end portion of the first and second webs such that the upper member is substantially parallel to and abuts the medial portion of the forward bogie arm when same is selectively moved to an upper most vertical position and the lower member is substantially parallel to and abuts the medial portion of the forward bogie arm when same is selectively moved to a downward most vertical position;

and wherein the second bogie arm retainer means comprises:

an upper member disposed between and connected to the first and second webs of the walking beam such that the upper member is angularly disposed a selected distance above the rearward bogie arm when the rearward bogie arm is in a normal position substantially parallel to the side of the frame; and a lower member disposed between and connected to the first and second webs of the walking beam such that the lower member is angularly disposed a selected distance below the medial portion of the rearward bogie arm when the rearward bogie arm is in the normal position, the upper and lower members diverging from each other in the direction of the second end portions of the first and second webs such that the upper member is substantially parallel to and abuts the medial portion of the rearward bogie arm when same is selectively moved to an upper most vertical position and the lower member is substantially parallel to and abuts the medial portion of the rearward bogie arm when same is selectively moved to a downward most vertical position.

* * * * *